United States Patent [19]
Szam

[11] Patent Number: 5,778,971
[45] Date of Patent: Jul. 14, 1998

[54] HEAD FOR CONDUCTING HEAT-EXCHANGE FLUID TO ROTATING SYSTEM

[75] Inventor: Peter Szam, Gerstetten, Germany

[73] Assignee: Christian Maier GmbH & Co. Maschinenfabrik, Heidenheim, Germany

[21] Appl. No.: 853,644

[22] Filed: May 9, 1997

[30] Foreign Application Priority Data

Apr. 8, 1994 [DE] Germany .................. 196 18 661.7

[51] Int. Cl.$^6$ .................................................. F28D 11/02
[52] U.S. Cl. .................................. 165/90; 165/89; 492/46
[58] Field of Search ............................. 165/98, 90, 95; 492/46

[56] References Cited

U.S. PATENT DOCUMENTS

| | | | |
|---|---|---|---|
| 1,953,525 | 4/1934 | Young | 165/90 |
| 2,331,615 | 10/1943 | Meyer . | |
| 3,638,606 | 2/1972 | Pieper et al. | 165/89 |
| 3,704,669 | 12/1972 | Christoff | 165/90 |
| 4,230,928 | 10/1980 | Janssen | 165/90 |
| 4,924,817 | 5/1990 | Seelen | 165/95 |
| 4,965,920 | 10/1990 | Smith . | |

FOREIGN PATENT DOCUMENTS

| | | |
|---|---|---|
| 0448730 | 10/1991 | European Pat. Off. . |
| 3417093 | 11/1995 | Germany . |

*Primary Examiner*—Denise L. Ferensic
*Assistant Examiner*—Christopher Atkinson
*Attorney, Agent, or Firm*—Herbert Dubno; Andrew Wilford

[57] ABSTRACT

A rotary steam-heated system and a source of steam under superatmospheric pressure are connected together by a coupling having a tubular shaft extending along and rotatable about an axis and having an outer end supporting the system and an inner end. A housing engaged around the inner end forms therewith a chamber connected to the source and opening into the tubular shaft so that steam from the source can flow through the chamber into the shaft and therethrough to the system. A bearing supports the shaft in the housing and a primary seal closing an outer side of the chamber is engaged between the housing and the shaft. A secondary seal between the primary seal and the bearing is engaged between the housing and the shaft and the housing forms an annular compartment around the shaft between the primary and secondary seals and is formed with at least one passage communicating between the compartment and the chamber so that some of the steam in the chamber can flow via the passage from the chamber into the compartment. The housing is cooled at the compartment and to condense steam therein so that the condensed steam lubricates the primary and secondary seals.

14 Claims, 4 Drawing Sheets

HEAD FOR CONDUCTING HEAT-EXCHANGE FLUID TO ROTATING SYSTEM

FIELD OF THE INVENTION

The present invention relates to a head for conducting a heat-exchange fluid to a rotating system. More particularly this invention concerns a coupling head for conveying steam or the like to a drying drum, heated roller, or the like.

BACKGROUND OF THE INVENTION

In many manufacturing systems a rotatable drum or roller is internally heated with steam so as to in turn heat a web or the like that is passed over this internally heated system. To this end the drum is mounted on the outer end of a tubular shaft whose inner end is provided with a coupling head supported via bearings on the shaft and itself connected to a source of the heated pressurized fluid, normally steam. Thus the head remains essentially stationary as the system rotates and the head can actually serve as the support for the shaft and the system it carries.

Normally the head is a housing forming a chamber pressurized with the steam and the inner end of the shaft projects into this chamber and is formed with perforations so the steam in the chamber can flow into the shaft. A primary seal closes the outer side os this chamber and a secondary seal is provided between the primary seal and the bearing that supports the housing on the shaft to protect this bearing from the steam. Thus this secondary seal has an outer side at atmospheric pressure.

When such a system is used with hot water, both seals stay slightly damp and can be counted on to have a long service life. When steam is used, however, normally only the secondary or outer seal is wetted, because the temperature and pressure at this region are such that the steam condenses to form water which acts as a usable lubricant. The primary seal is wholly surrounded rounded by steam so that it runs basically dry and therefore wears out rapidly.

OBJECTS OF THE INVENTION

It is therefore an object of the present invention to provide an improved coupling head for supplying steam under pressure sure to a rotating system.

Another object is the provision of such an improved coupling head for supplying steam under pressure to a rotating system which overcomes the above-given disadvantages, that is which ensures good lubrication of both seals.

SUMMARY OF THE INVENTION

A rotary steam-heated system and a source of steam under superatmospheric pressure are connected together by a coupling having according to the invention a tubular shaft extending along and rotatable about an axis and having an outer end supporting the system and an inner end. A housing engaged around the inner end forms therewith a chamber connected to the source and opening into the tubular shaft so that steam from the source can flow through the chamber into the shaft and therethrough to the system. A bearing supports the shaft in the housing and a primary seal closing an outer side of the chamber is engaged between the housing and the shaft. A secondary seal between the primary seal and the bearing is engaged between the housing and the shaft and the housing forms an annular compartment around the shaft between the primary and secondary seals and is formed with at least one passage communicating between the compartment and the chamber so that some of the steam in the chamber can flow via the passage from the chamber into the compartment. The housing is cooled at the compartment to condense steam therein so that the condensed steam lubricates the primary and secondary seals.

Thus both of the seals according to the invention are kept lubricated by condensing part of the steam being conducted through the coupling. As a result the service life of these seals is greatly increased. Since the same pressure will reign to both sides of the primary seal, that is in the chamber and compartment, this seal can be of fairly simple construction, typically a lip-type seal will do the job. According to the invention the secondary seal is a slide-ring seal and an insulating ring seated in the housing subdivides the chamber from the compartment and carries the primary seal. This insulating ring is formed with a groove in which the primary seal is set.

The shaft in accordance with the invention is of double-wall construction where it engages the seals. In addition a partition sleeve subdivides the compartment into an outer subcompartment engaging the cooler and an inner subcompartment engaging the shaft. The subcompartments are connected together at axially opposite ends. This sleeve is formed with angularly spaced, axially extending, and axially projecting ridges that define the outer subcompartment and openings between the inner and outer subcompartments. Angled vane formations in the inner subcompartment on the shaft conduct the steam axially along the inner subcompartment. These screwthread-like vanes are carried on a sleeve mounted on the shaft.

According to the invention the housing forms at the compartment an annular cooling chamber connected to the cooler. Means is provided for circulating cooling water through the cooling chamber and the housing is formed with ribs projecting into the cooling chamber to maximize heat transfer between the cooled metal of the housing and the steam in the outer subcompartment.

The housing in accordance with the invention is formed with a plurality of such passages angularly spaced about the axis. Respective valves in the passages open only when above the axis so that condensed steam is unable to flow back from the compartment to the chamber via the passages below the axis.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
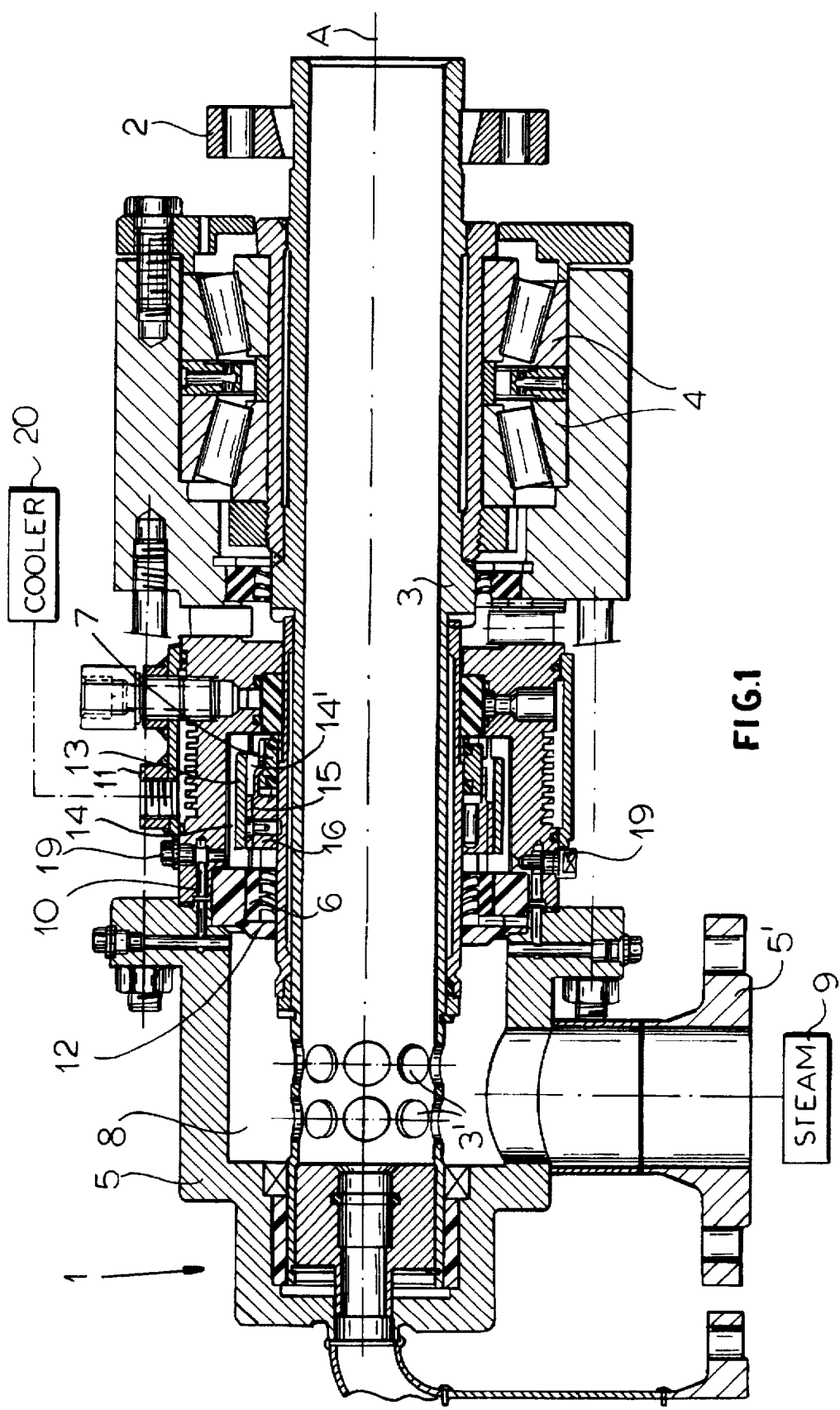
FIG. 1 is a partly diagrammatic axial section through a head according to the invention.

As seen in FIG. 1 a tubular shaft 3 extending along an axis A has an inner or upstream end carrying a coupling head 1 and an outer end connected to a pressurized heated system part, for instance a drying drum, part of which is shown at 2. The head 1 has a housing 5 that does not rotate about the axis A with the shaft 3 and that has a lateral fitting 5' to which is connected a source 9 of steam under pressure. Bearings 4 support the housing 5 on the shaft 3 for rotation relative thereto about its axis A.

Figure 2:
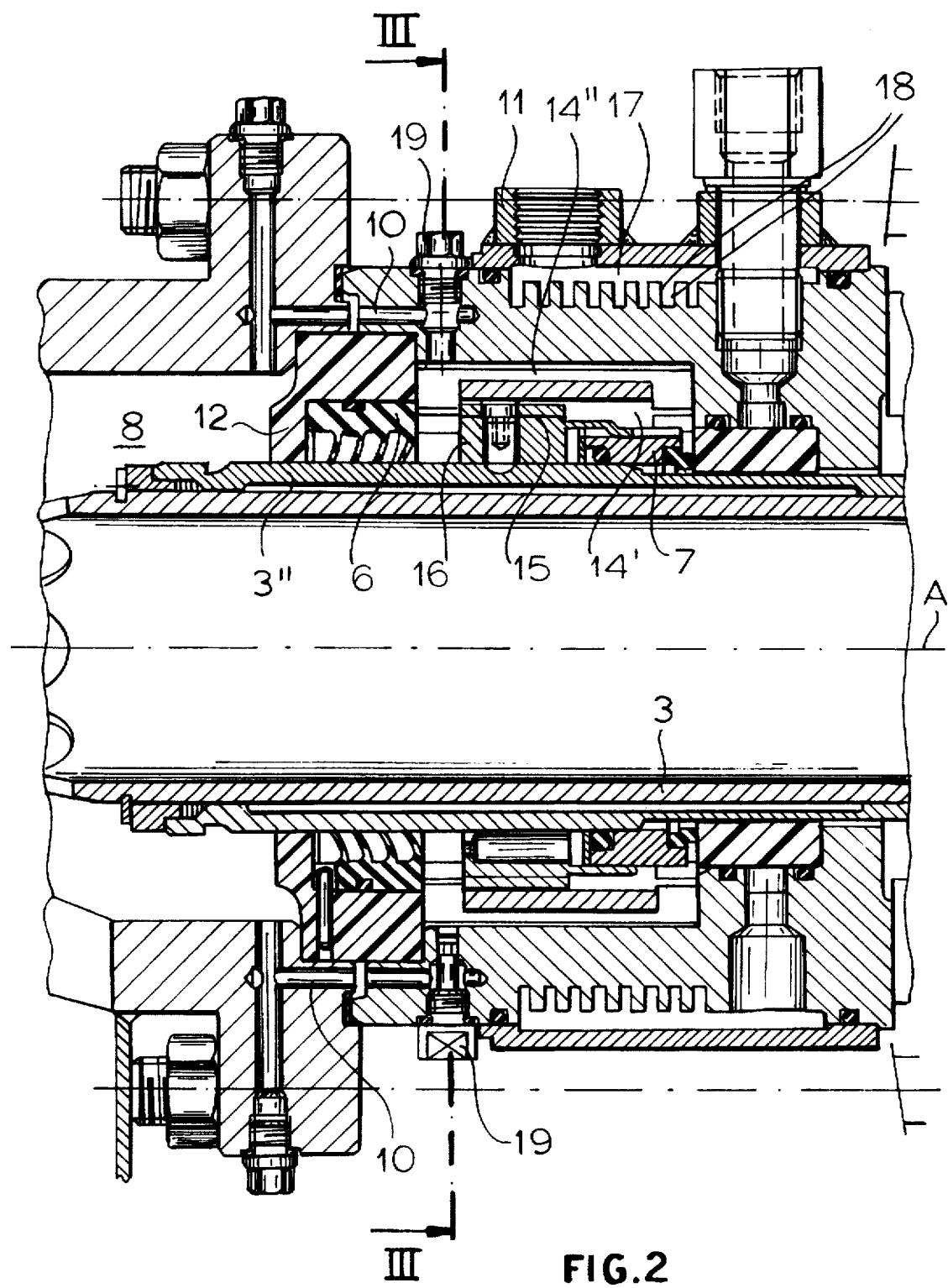
FIG. 2 is a large-scale view of a detail of FIG. 1.
Figure 3:
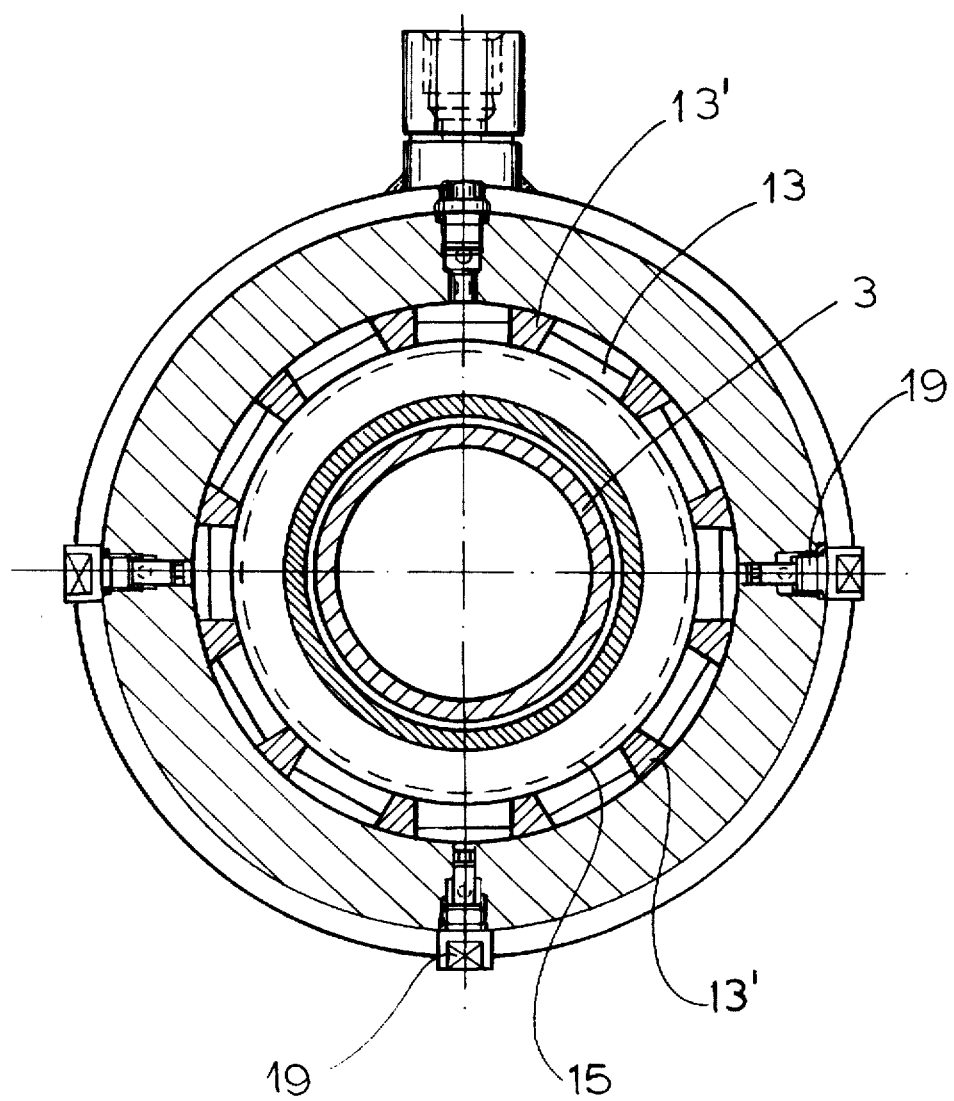
FIG. 3 is a section taken along line III—III of FIG. 1.
Figure 4:
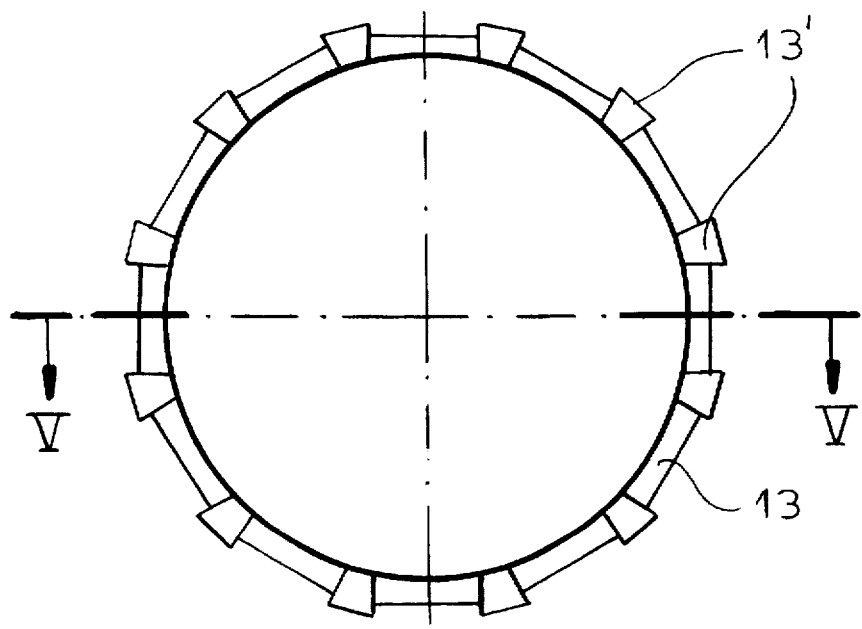
FIG. 4 is an end view of an element of the head.
Figure 5:
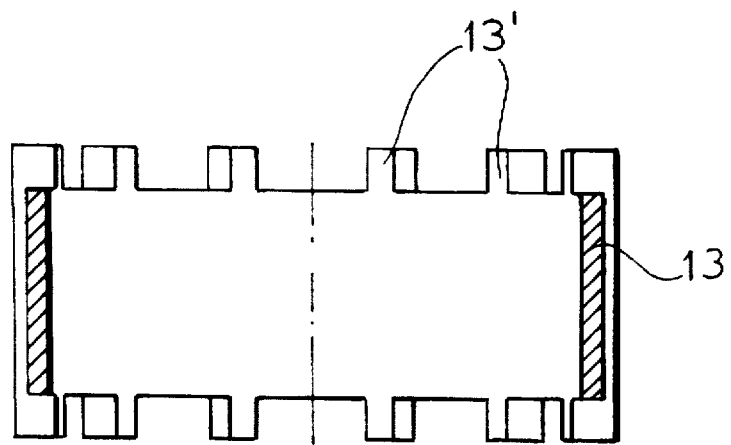
FIG. 5 is a section taken along line V—V of FIG. 4.

As better shown in FIG. 2 the housing 5 forms around the inner end of the tubular shaft 3 is formed with radially throughgoing perforations 3' to communicate with a chamber 8 inside the housing 5 which is supplied pressurized steam from the source 9. A flexible lip-type seal 6 is seated in an insulating ring 12 to define the downstream or outer side of this chamber 8 and another conventional seal ring 7 is engaged somewhat outward of the seal 6 between the housing 5 and the shaft 3. The housing 5 defines between these seals 6 and 7 an annular compartment 14 communicating around the ring 12 via four passages 10 with the chamber 8. Thus there is no significant pressure differential across the seal 6 so that the illustrated lip-type seal is quite effective. Each passage 10 is provided with a respective valve 10 that only opens when it is above the axis A so that, as described below, any condensate will not run back along the passages 10 into the chamber 8.

The compartment 14 is divided by a partition sleeve 13 centered on the axis A into an inner subcompartment 14' and an outer subcompartment 14". The sleeve 13 has radially and axially projecting ridges that space it properly in the compartment 14 and is carried on another sleeve 16 having angled vanes 15 that serve to conduct fluid axially outward. Thus this sleeve 13 is fixed by the sleeve 16 on an outer shell 3" of the shaft 3 so that it rotates therewith. Thus the steam in the compartment 14 will be circulated annularly as an inverting toroid.

A cooling compartment 17 is formed in the housing 5 outside the compartment 14 and is connected via fittings 11 to a cooler 20. Ribs 18 of the housing 5 ensure good heat transfer between the fluid circulated through the compartment 17 by the cooler 20 and the housing 5 level with the compartment 14.

Thus steam that moves along the passages 10 past the valves 19 will enter the inner end of the compartment 14 and will be pulled along the inner subcompartment 14' by the formations 15. This steam will then be condensed in the outer subcompartment 14" to form water that serves to lubricate both of the seals 6 and 7.

I claim:

1. In combination with a rotary steam-heated system and a source of steam under superatmospheric pressure, a coupling comprising:

a tubular shaft extending along and rotatable about an axis and having an outer end supporting the system and an inner end;

a housing engaged around the inner end and forming therewith a chamber connected to the source and opening into the tubular shaft, whereby steam from the source can flow through the chamber into the shaft and therethrough to the system;

a bearing supporting the shaft in the housing;

a primary seal closing an outer side of the chamber and engaged between the housing and the shaft;

a secondary seal between the primary seal and the bearing and engaged between the housing and the shaft, the housing forming an annular compartment around the shaft between the primary and secondary seals and being formed with at least one passage communicating between the compartment and the chamber, whereby some of the steam in the chamber can flow via the passage from the chamber into the compartment; and means for cooling the housing at the compartment and for condensing steam therein, whereby the condensed steam lubricates the primary and secondary seals.

2. The coupling defined in claim 1 wherein the secondary seal is a slide-ring seal.

3. The coupling defined in claim 2 wherein the primary seal is a lip-type seal.

4. The coupling defined in claim 3, further comprising an insulating ring seated in the housing, subdividing the chamber from the compartment, and carrying the primary seal.

5. The coupling defined in claim 4 wherein the insulating ring is formed with a groove in which the primary seal is set.

6. The coupling defined in claim 1 wherein the shaft is of double-wall construction where it engages the seals.

7. The coupling defined in claim 1, further comprising a partition sleeve subdividing the compartment into an outer subcompartment engaging the cooling means and an inner subcompartment engaging the shaft, the subcompartments being connected together at axially opposite ends.

8. The coupling defined in claim 7 wherein the sleeve is formed with angularly spaced, axially extending, and axially projecting ridges that define the outer subcompartment and openings between the inner and outer subcompartments.

9. The coupling defined in claim 7, further comprising angled vane formations in the inner subcompartment on the shaft for conducting the steam axially along the inner subcompartment.

10. The coupling defined in claim 9, further comprising a sleeve mounted on the shaft and formed with the vane formations.

11. The coupling defined in claim 1 wherein the housing forms at the compartment an annular cooling chamber connected to the cooling means.

12. The coupling defined in claim 11 wherein the cooling means includes means for circulating cooling water through the cooling chamber.

13. The coupling defined in claim 11 wherein the housing is formed with ribs projecting into the cooling chamber.

14. The coupling defined in claim 1 wherein the housing is formed with a plurality of such passages angularly spaced about the axis, the coupling further comprising respective valves in the passages that open only when above the axis, whereby condensed steam is unable to flow back from the compartment to the chamber via the passages below the axis.

* * * * *